(12) United States Patent
Kikuchi

(10) Patent No.: US 12,284,418 B2
(45) Date of Patent: Apr. 22, 2025

(54) VIDEO DISTRIBUTION IN WHICH DISPLAY IS CONTROLLED BASED ON BEHAVIOR OF VIEWER

(71) Applicant: Rakuten Group, Inc., Tokyo (JP)

(72) Inventor: Ko Kikuchi, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/922,927

(22) PCT Filed: May 26, 2022

(86) PCT No.: PCT/JP2022/021502
§ 371 (c)(1),
(2) Date: Nov. 2, 2022

(87) PCT Pub. No.: WO2023/228341
PCT Pub. Date: Nov. 30, 2023

(65) Prior Publication Data
US 2024/0223850 A1   Jul. 4, 2024

(51) Int. Cl.
*H04N 21/254* (2011.01)
*H04N 21/2187* (2011.01)
*H04N 21/442* (2011.01)

(52) U.S. Cl.
CPC ... *H04N 21/44218* (2013.01); *H04N 21/2187* (2013.01); *H04N 21/2542* (2013.01)

(58) Field of Classification Search
CPC ................................................. H04N 21/2542
See application file for complete search history.

(56) References Cited

U.S. PATENT DOCUMENTS

| | | | | |
|---|---|---|---|---|
| 2009/0293079 | A1* | 11/2009 | McKee | H04N 21/4788 725/10 |
| 2016/0286275 | A1* | 9/2016 | Maeda | G06Q 30/0631 |
| 2022/0385710 | A1* | 12/2022 | Chen | H04N 21/2187 |

FOREIGN PATENT DOCUMENTS

JP   2015-090526 A   5/2015

* cited by examiner

*Primary Examiner* — Michael H Hong
(74) *Attorney, Agent, or Firm* — Sughrue Mion, PLLC

(57) ABSTRACT

A collector (101) collects behaviors of a plurality of viewers viewing a live streaming video from a plurality of viewer terminals (300) respectively used by the plurality of viewers. The allocator (103) allocates, to each viewer of the plurality of viewers, another viewer specified as a referent from among the plurality of viewers based on the collected behaviors. The generator (104) generates display control information for each viewer based on a behavior of the viewer and a behavior of the referent allocated to the viewer among the collected behaviors. The transmitter (105) transmits the generated display control information to a viewer terminal (300) used by each viewer.

8 Claims, 13 Drawing Sheets

FIG. 5

| VIEWER ID | VIDEO ID | ITEM ID | BEHAVIOR STATUS | DATE AND TIME OF BEHAVIOR |
|---|---|---|---|---|
| V1 | X1 | X1-1 | STARTING VIEWING | 2022/05/01 21:00 |
| V1 | X1 | X1-1 | BROWSING SALES PAGE | 2022/05/01 21:03 |
| V1 | X1 | X1-1 | PLACING INTO CART | 2022/05/01 21:05 |
| V1 | X1 | X1-1 | COMPLETING PURCHASING SETTLEMENT | 2022/05/01 21:06 |
| V1 | X1 | X1-2 | STARTING VIEWING | 2022/05/01 21:15 |
| V1 | X1 | X1-3 | STARTING VIEWING | 2022/05/01 21:30 |
| V1 | X1 | X1-3 | INPUTTING COMMENT | 2022/05/01 21:32 |
| V1 | X1 | X1-3 | ENDING VIEWING | 2022/05/01 21:45 |
| : | : | : | : | : |
| V1 | X10 | X10-1 | STARTING VIEWING | 2022/05/8 21:00 |
| : | : | : | : | : |
| V2 | X1 | X1-1 | STARTING VIEWING | 2022/05/01 21:00 |
| V2 | X1 | X1-1 | INPUTTING COMMENT | 2022/05/01 21:10 |
| : | : | : | : | : |
| V2 | X10 | X10-1 | STARTING VIEWING | 2022/05/8 21:00 |
| : | : | : | : | : |
| V3 | X10 | X10-1 | STARTING VIEWING | 2022/05/8 21:00 |
| : | : | : | : | |

FIG. 6

| VIEWER ID | REFERENT ID | | | | | | |
|---|---|---|---|---|---|---|---|
| | 1 | 2 | ... | M | ... | N-1 | N |
| V1 | V2 | V3 | ... | V10 | ... | - | - |
| V2 | V1 | V3 | ... | V11 | ... | - | - |
| V3 | V1 | V2 | ... | V12 | ... | - | - |
| : | : | : | : | : | : | : | : |

FIG. 7

| VIEWER ID | REFERENT ID | | | | | | |
|---|---|---|---|---|---|---|---|
| | 1 | 2 | ... | M | ... | N-1 | N |
| V1 | V2 | V3 | ... | V10 | ... | V19 | V20 |
| V2 | V1 | V3 | ... | V11 | ... | V21 | V22 |
| V3 | V1 | V2 | ... | V12 | ... | V23 | V24 |
| ⋮ | ⋮ | ⋮ | ⋮ | ⋮ | ⋮ | ⋮ | ⋮ |

VIDEO DISTRIBUTION IN WHICH DISPLAY IS CONTROLLED BASED ON BEHAVIOR OF VIEWER

CROSS REFERENCE TO RELATED APPLICATIONS

This application is a National Stage of International Application No. PCT/JP2022/021502 filed May 26, 2022.

TECHNICAL FIELD

The present disclosure relates to video distribution in which display is controlled based on the behavior of a viewer.

BACKGROUND ART

In recent years, techniques for displaying a live streaming video on a terminal of a viewer including information pertaining to a plurality of viewers currently viewing the video are known.

For example, Patent Literature 1 discloses a system in which a video content and avatars of viewers are displayed on a viewer terminal, and a viewer can communicate with other viewers via the avatars while viewing the video content.

CITATION LIST

Patent Literature

Patent Literature 1: Unexamined Japanese Patent Application Publication No. 2015-90526

SUMMARY OF INVENTION

Technical Problem

However, in a system such as the one disclosed in the above-described Patent Literature 1, there is a problem of increased load of the display processing on the system as the displayed avatars increase with the increase in the number of viewers.

The present disclosure is made in light of the above-described circumstances, and the objective of the present disclosure is to provide a video distribution system, a display control method, and a non-transitory recording medium that are capable of reducing the load of display processing.

Solution to Problem

A video distribution system according to a first aspect of the present disclosure includes one or more processors, wherein at least one of the one or more processors performs the processing of:
  collecting behaviors of a plurality of viewers viewing a live streaming video from a plurality of viewer terminals respectively used by the plurality of viewers;
  allocating, to each viewer of the plurality of viewers, another viewer specified as a referent from among the plurality of viewers based on the collected behaviors;
  generating display control information for the each viewer based on a behavior of the each viewer and a behavior of the referent allocated to the each viewer among the collected behaviors: and
  transmitting the generated display control information to a viewer terminal used by the each viewer.

A display control method according to a second aspect of the present disclosure includes: by a computer,
  collecting behaviors of a plurality of viewers viewing a live streaming video from a plurality of viewer terminals respectively used by the plurality of viewers;
  allocating, to each viewer of the plurality of viewers, another viewer specified as a referent from among the plurality of viewers based on the collected behaviors;
  generating display control information for the each viewer based on a behavior of the each viewer and a behavior of the referent allocated to the each viewer among the collected behaviors: and
  transmitting the generated display control information to a viewer terminal used by the each viewer.

A non-transitory recording medium according to a third aspect of the present disclosure on which is recorded a program for causing a computer to perform:
  collecting behaviors of a plurality of viewers viewing a live streaming video from a plurality of viewer terminals respectively used by the plurality of viewers;
  allocating, to each viewer of the plurality of viewers, another viewer specified as a referent from among the plurality of viewers based on the collected behaviors;
  generating display control information for the each viewer based on a behavior of the each viewer and a behavior of the referent allocated to the each viewer among the collected behaviors; and
  transmitting the generated display control information to a viewer terminal used by the each viewer.

Advantageous Effects of Invention

According to the present disclosure, the load of the display processing can be reduced.

BRIEF DESCRIPTION OF DRAWINGS

FIG. 5 is a diagram for describing behavior history information according to the embodiment;

FIG. 6 is a diagram for describing referent information according to the embodiment;

FIG. 7 is a diagram for describing referent information according to the embodiment:

DESCRIPTION OF EMBODIMENTS (1. Overall Configuration)

Figure 1:
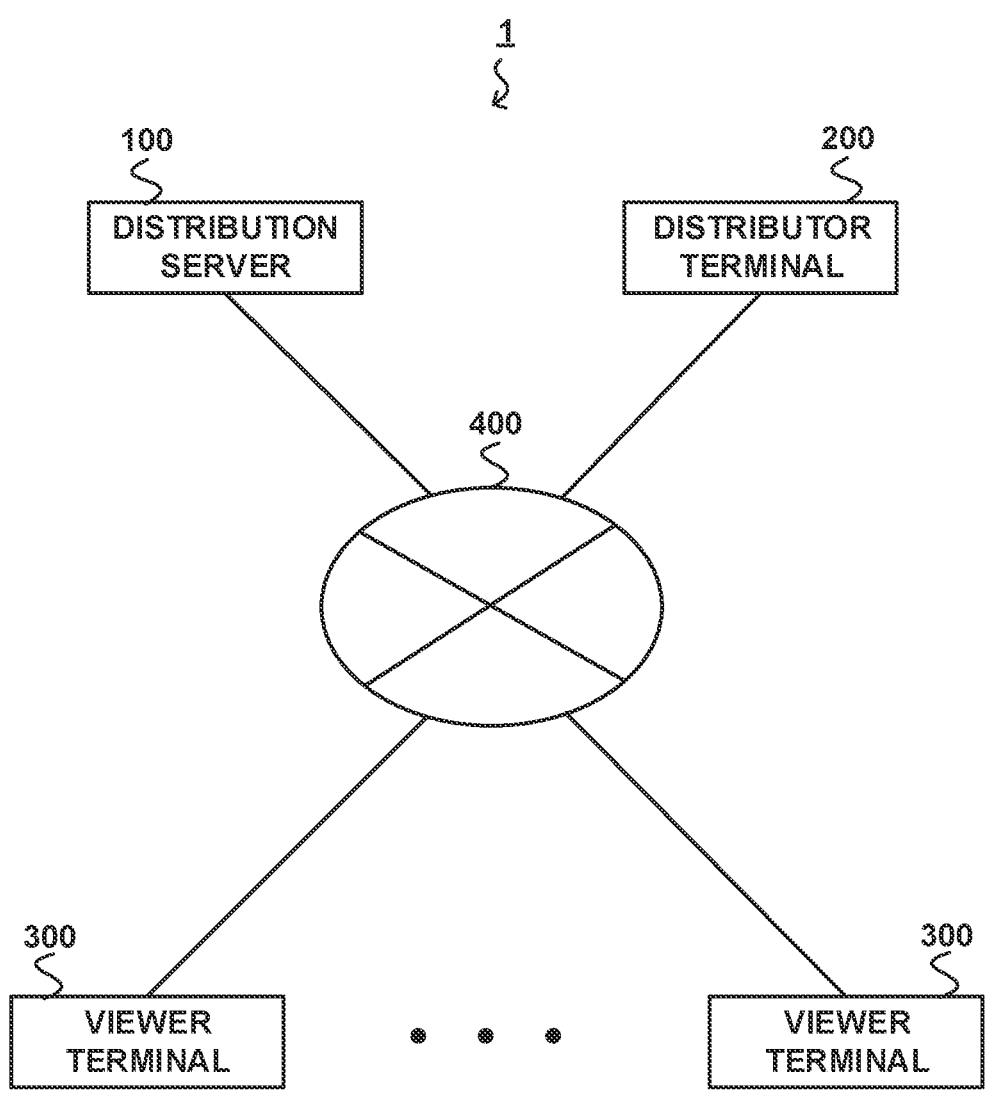
FIG. 1 is a diagram illustrating the overall configuration of a video distribution system according to an embodiment.

A video distribution system 1 according to an embodiment of the present disclosure provides a video distribution service. As illustrated in FIG. 1, the video distribution system 1 includes a distribution server 100, a distributor terminal 200, and a plurality of viewer terminals 300, each of which is communicatively connected via a computer communication network 400 such as the Internet.

The distribution server 100 is a device for managing the video distribution service provided by the video distribution system 1. Specifically, the distribution server 100 manages a video distributed from the distributor terminal 200 and distributes the video in response to a request from a viewer terminal 300.

The distributor terminal 200 is a terminal used by a distributor who distributes a video. For example, the distributor transmits a video being filmed to the distribution server 100 using the distributor terminal 200 to live stream the video to the viewer terminal 300 via the distribution server 100.

The viewer terminal 300 is a terminal used by a viewer viewing the distributed video. For example, the viewer logs in via the viewer terminal 300 to the video distribution service managed by the distribution server 100 and views the live streaming video from the distributor terminal 200 via the distribution server 100.

(2. Hardware Configuration of the Distribution Server)

Figure 2:
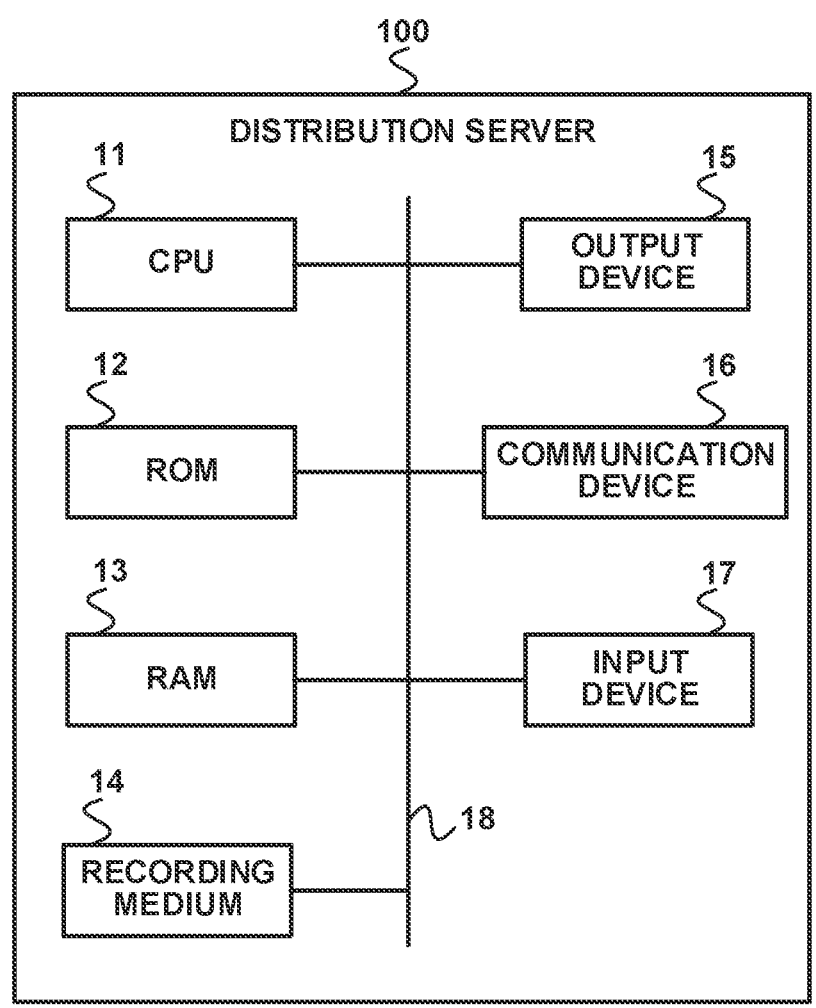
FIG. 2 is a block diagram illustrating the hardware configuration of a distribution server according to the embodiment.

FIG. 2 is a block diagram illustrating the hardware configuration of the distribution server 100.

The distribution server 100 includes a central processing unit (CPU) 11, a read-only memory (ROM) 12, a random-access memory (RAM) 13, a recording medium 14, an output device 15, a communication device 16, and an input device 17, as illustrated in FIG. 2. Each component is connected through a bus 18.

The CPU 11 controls the entire operation of the distribution server 100 and is connected to each component to exchange control signals and data.

The ROM 12 records a program and various types of data for operation necessary for the entire operation control of the distribution server 100.

The RAM 13 is for temporarily recording data and a program and retains the program, data, and other data necessary for communications that are read out from the recording medium 14.

The recording medium 14 is configured by a hard disk, a flash memory, and/or the like and records data to be processed by the distribution server 100.

The output device 15 includes a display device, such as a liquid crystal display (LCD) and a backlight, and an audio output device such as a speaker. The output device 15, for example, outputs data that are output from the CPU 11 under the control of the CPU 11.

The communication device 16 includes a communication interface for connecting the distribution server 100 to the computer communication network 400, such as the Internet, and interaction with another information processing device and the like is performed via the communication device 16.

The input device 17 includes input devices such as a button, a keyboard, a touch panel, a microphone, a camera, and an optical scanner. The input device 17 receives an operation input from a user of the distribution server 100 and outputs a signal corresponding to the received operation input to the CPU 11.

(3. Functional Configuration of the Distribution Server of the Embodiment)

The functional configuration of the distribution server 100 is described with reference to FIG. 3.

The distribution server 100 functionally includes: a collector 101; a storage 102; an allocator 103; a generator 104; and a transmitter 105. In the present embodiment, the CPU 11 and the communication device 16 jointly function as the collector 101 and the transmitter 105: the recording medium 14 functions as the storage 102; and the CPU 11 functions as the allocator 103 and the generator 104.

The following describes the function of the distribution server 100 in an assumption that a video distributed in the video distribution service is related to live commerce. Here, live commerce is a form of electronic commerce in which a distributor live streams a video pertaining to an item and a viewer who is viewing the live video can purchase the item. Therefore, the video is for introducing an item by a distributor and for promoting the sales of the item.

The video distributed by the distribution server 100 to the viewer terminal 300 includes a video filed by the distributor, information about the item introduced by the distributor, and an avatar, which is a character that serves as the alter ego of the viewer who uses the viewer terminal 300.

Figure 4:
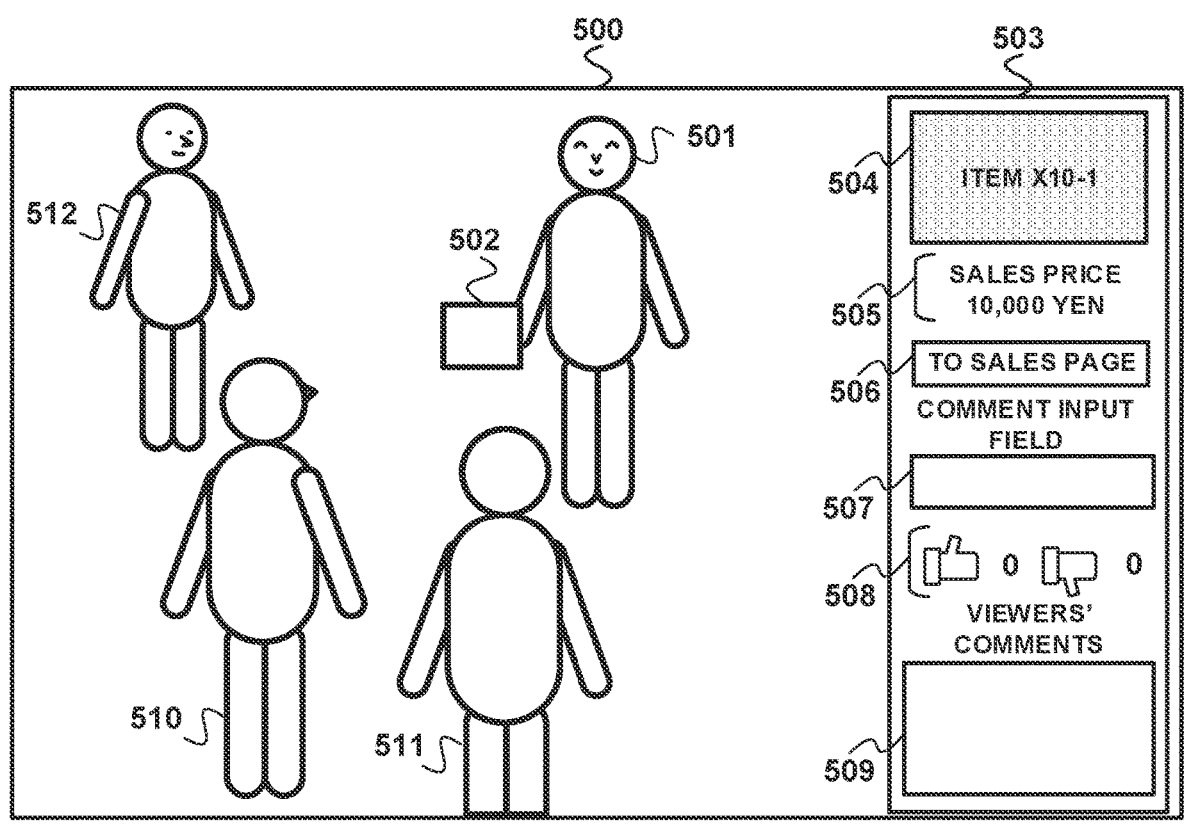
FIG. 4 is a diagram illustrating avatars displayed on a screen of a viewer terminal according to the embodiment.

FIG. 4 illustrates a screen 500 of the viewer terminal 300 of a viewer "V1" who is viewing a video "X10" immediately after the live streaming of the video "X10" started. The screen 500 displays the video of the distributor 501 holding an item "X10-1" 502 and introducing the item "X10-1." The screen 500 also displays a panel 503 that displays information about the item "X10-1" being live-streamed. The panel 503 includes an image 504 of the item "X10-1," information 505 of the sales price of the item "X10-1," a button 506 for transitioning to a sales page for selling the item "X10-1," an input field 507 for entering a comment by the viewer, a rating icon 508, and a display field 509 for displaying the comment entered by the viewer. The rating icon 508 includes a high rating icon and a low rating icon, and when the viewer selects the good rating icon or the bad rating icon by clicking or the like, the number displayed adjacent to the selected rating icon increments. The number displayed adjacent to the rating icon is a cumulative number of times selected by a plurality of viewers viewing the video "X10." In addition, the display field 509 displays comments entered by a plurality of viewers viewing the video "X10."

Further, the screen 500 displays the avatars 510 to 512 of viewers viewing the live streaming video. The avatars 510, 511, 512 are respectively avatars of the viewer "V1," the viewer "V2," and the viewer "V10." In order to simplify the description, three avatars are displayed on the screen 500 of FIG. 4, but, in fact, a larger number of avatars are displayed according to the number of referents described later.

Figure 3:
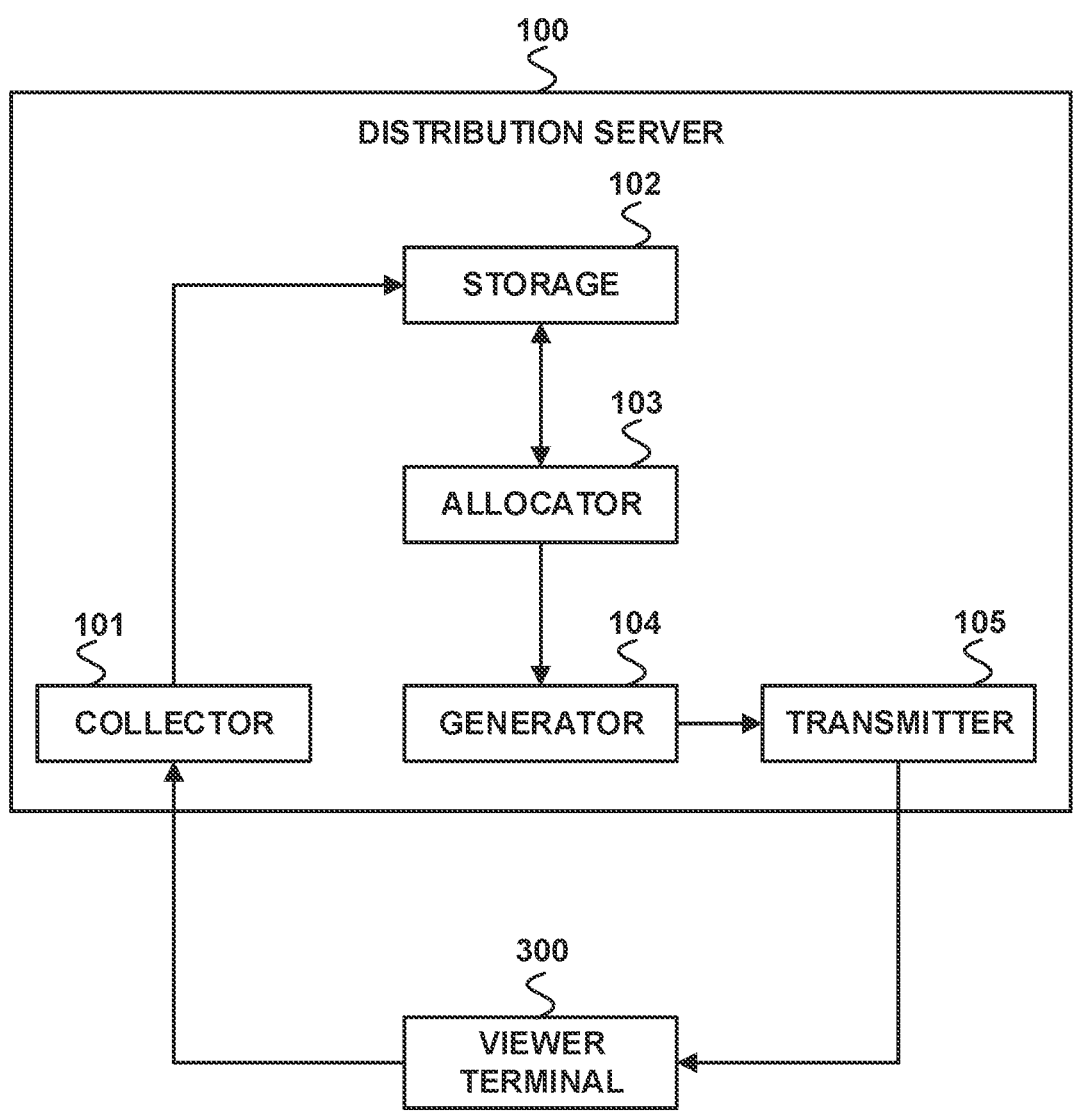
FIG. 3 is a diagram illustrating the functional configuration of the distribution server according to the embodiment.

The collector 101 of FIG. 3 collects behaviors of a plurality of viewers viewing the live streaming video from a plurality of viewer terminals 300 respectively used by the plurality of viewers.

The behavior of a viewer is a behavior taken by the viewer at the viewer terminal 300 while the video is being live-streamed. For example, when live streaming of a video related to live commerce starts, the collector 101 collects behaviors of a viewer of starting and ending viewing the video. Here, the behaviors collected by the collector 101 include a behavior related to purchasing the item introduced in the video. The item refers to any item introduced or promoted in a live commerce video, such as a product, a service, and/or the like. The behavior related to purchasing the item includes, for example, browsing a sales page of the item by a viewer, placing the item in an electronic cart on the sales page, and completing a purchase settlement on the sales page. The collected behavior information is stored as a behavior history in the storage 102.

FIG. 5 illustrates an example of behavior history information stored in the storage 102 as the behavior history. The behavior history information includes a viewer ID for identifying a viewer, a video ID for identifying a video viewed by the viewer, an item ID for identifying an item introduced in the video, a behavior status indicating the content of a behavior taken by the viewer, and date and time of the behavior taken by the viewer.

The allocator 103 of FIG. 3 allocates, to each viewer of the plurality of viewers, another viewer specified as a referent from among the plurality of viewers based on the collected behaviors.

The referent is another viewer who is viewing the same video as the viewer and whose behavior is referred to by the viewer while the viewer is viewing the video.

For example, before the video "X10" is live-streamed, the allocator 103 first allocates a referent to each viewer who has a viewing reservation of the video "X10" to be live-streamed. Specifically, the allocator 103 allocates another viewer specified as a referent from among a plurality of viewers with a viewing reservation to each of the viewers with the viewing reservation based on the past behavior history information of the plurality of viewers with the viewing reservation.

For example, the allocator 103 allocates a referent to each of viewers "V1" to "VL" (L is a natural number greater than or equal to 2) who have the viewing reservation of the video "X10." The allocator 103 first identifies a viewed video from the video ID in the behavior history information for the viewer "V1" and for the other viewers "V2" to "VL" with the viewing reservation. Then, the allocator 103 allocates another viewer who has viewed a video of the same distributor as the distributor of the video viewed by the viewer "V1" as a referent to the viewer "V1." Alternatively, the allocator 103 identifies the genre of a viewed video from the video ID in the behavior history information and allocates another viewer who has viewed a video of the same genre as the video viewed by the viewer "V1" as a referent to the viewer "V1." Alternatively, the allocator 103 identifies the genre of the purchased item from the item ID and the behavior status in the behavior history information and allocates another viewer who has purchased an item of the same genre as the item purchased by the viewer "V1" as a referent to the viewer "V1." In a similar manner to the viewer "V1," a referent is allocated to each of the viewers "V2" to "VL" based on the distributor of the viewed video, the genre of the viewed video, or the genre of the purchased item.

Here, it is assumed that the upper limit value of the number of referents allocated to each viewer by the allocator 103 is determined in advance. The upper limit value is arbitrarily set by the administrator of the distribution server. Then, the number of referents allocated to a viewer prior to the live streaming of the video is set to an upper limit value that is even lower than the predetermined upper limit value. In this way, there is a room for allocating a viewer who participates after the live streaming of the video has started or a viewer who satisfies a salient condition described later during the live streaming of the video, as a referent. For example, assuming that the upper limit value is N, the allocator 103 allocates referents to each viewer with an upper limit value set as M prior to live streaming of the video (where M is a natural number not less than 1 and less than N. For example, 0.6×N (the fractional portion dropped)). The information of the referents allocated to each viewer is stored in the storage 102.

FIG. 6 illustrates an example of referent's referent information stored in the storage 102. The referent information includes: a viewer ID for identifying a viewer to whom the referent is allocated; and a referent ID for identifying the referent. The referent ID indicates another viewer viewing the same video as the video viewed by the viewer indicated by the viewer ID. The referent information in FIG. 6 indicates a state before the live streaming of the video "X10" starts. For example, the record in the first row of FIG. 6 indicates that other viewers "V2" to "V10" with the viewing reservation of the video "X10" are allocated as referents to the viewer "V1" with the viewing reservation of the video "X10." Note that the referents allocated to each of the plurality of viewers may overlap in part or all or may not overlap at all.

The generator 104 of FIG. 3 generates display control information for each viewer based on the behavior of the viewer and the behavior of the referent allocated to the viewer among the collected behaviors.

The display control information is information that controls a mode of the avatar displayed on the viewer terminal 300. The distribution server 100 transmits display control information to the viewer terminal 300 used by each viewer and causes the viewer terminal 300 to display avatars of each viewer and of the referent allocated to the viewer by changing the modes of the avatars based on the transmitted display control information.

For example, the generator 104 refers to the behavior history information of the viewer "V1" and the viewers "V2" to "V10" allocated as referents before the live streaming of the video "X10" starts and generates display control information that displays avatars by enlarging the avatar of a viewer who has purchased the item a larger number of times on the screen. The generator 104 also generates display control information similarly for each of the viewers "V2" to "VL" who have the viewing reservation. In addition, after the live streaming of the video "X10" started, the generator 104 generates display control information of the avatars of each viewer and the referents by referring to the behavior history information collected by the collector 101 and stored in the storage 102 during the live streaming.

The transmitter 105 of FIG. 3 transmits the generated display control information to the viewer terminal 300 that is used by each viewer.

For example, the transmitter 105 transmits the generated display control information to the viewer terminals 300 of the viewers "V1" to "VL."

For example, if the transmitter 105 transmits, to the viewer terminal 300 of the viewer "V1," display control information for displaying avatars that are enlarged in the order of the viewers "V10," "V1," and "V2," the viewer terminal 300 of the viewer "V1" displays avatars that are enlarged in the order of the avatars 512, 510, and 511 as in FIG. 4.

If the collected behavior satisfies a salient condition, the allocator 103 allocates a viewer whose behavior satisfies the salient condition as a new referent, to each viewer who is not allocated with the referent whose behavior satisfies the salient condition as the referent.

The salient condition is a behavior that stands out from the behaviors of other viewers, such as, a behavior related to purchasing of the item. Specific examples of the salient condition are browsing a sales page of the item, placing the item in an electronic cart, and completing a purchase settlement of the item.

For example, it is assumed that a behavior collected after the start of the live streaming for a viewer "V19" who is not allocated as the referent to the viewer "V1" is completion of a purchase settlement of the item "X10-1." It is also assumed that a behavior collected after the start of the live streaming for a viewer "V20" who is not allocated as the referent to the viewer "V1" is placing the item "X10-1" in the electronic cart. In this case, the allocator 103 determines that the behaviors of the viewer "V19" and the viewer "V20" satisfy the salient conditions and that the viewer "V19" and the viewer "V20" are not allocated to the viewer "V1" as referents, and allocates the viewer "V19" and the viewer "V20" as new referents to the viewer "V1." Once the new referents are allocated, the referent information is updated by adding the IDs of the viewer "V19" and the viewer "V20" to the referent IDs of the viewer "V1" as illustrated in FIG. 7.

Here, if the number of referents allocated to each viewer has reached a threshold, the allocator 103 deletes one referent from the referents allocated to each viewer and then allocates a viewer whose behavior satisfies the salient condition as a new referent.

The threshold is the upper limit value of the number of referents allocated to a viewer.

For example, when the upper limit value N referents have already been allocated to the viewer "V1" and the allocator 103 attempts to allocate the viewer "V19" and the viewer "V20" as new referents to the viewer "V1," two of the N viewers who have already been allocated as referents are deleted from the referent information of the viewer "V1."

Specifically, when the number of referents allocated to each viewer has reached the threshold, the allocator 103 deletes a referent with a lowest degree of the collected behavior among the referents allocated to the viewer.

The degree of behavior is represented, for example, by the frequency of the behavior taken by a viewer during the live streaming of a video or by the stage of the item purchase procedure. For example, the more frequently a behavior related to a live streaming video, such as selecting the rating icon 508, entering a comment, browsing the sales page, placing the item into the electronic cart, and completing a purchase settlement, is performed, the higher the degree of behavior is considered. Alternatively, with regard to a behavior related to a live streaming video, the degree of the behavior is considered to be higher as the stage of the item purchase procedure is closer to completion of a purchase settlement. For example, browsing the sales page, placing the item into the electronic cart, and completing a purchase settlement, are considered to be behaviors of higher degrees in ascending order.

For example, when the number of referents allocated to the viewer "V1" has reached N, the allocator 103 deletes one referent with the lowest degree of behavior among the N referents and allocates the viewer "V19" as a new referent. When the viewer "V19" is allocated as a new referent, the number of referents allocated to the viewer "V1" reaches N, thus, the allocator 103 further deletes another referent with the lowest degree of behavior among the N referents including the viewer "V19" and allocates the viewer "V20" as a new referent.

Figure 8:
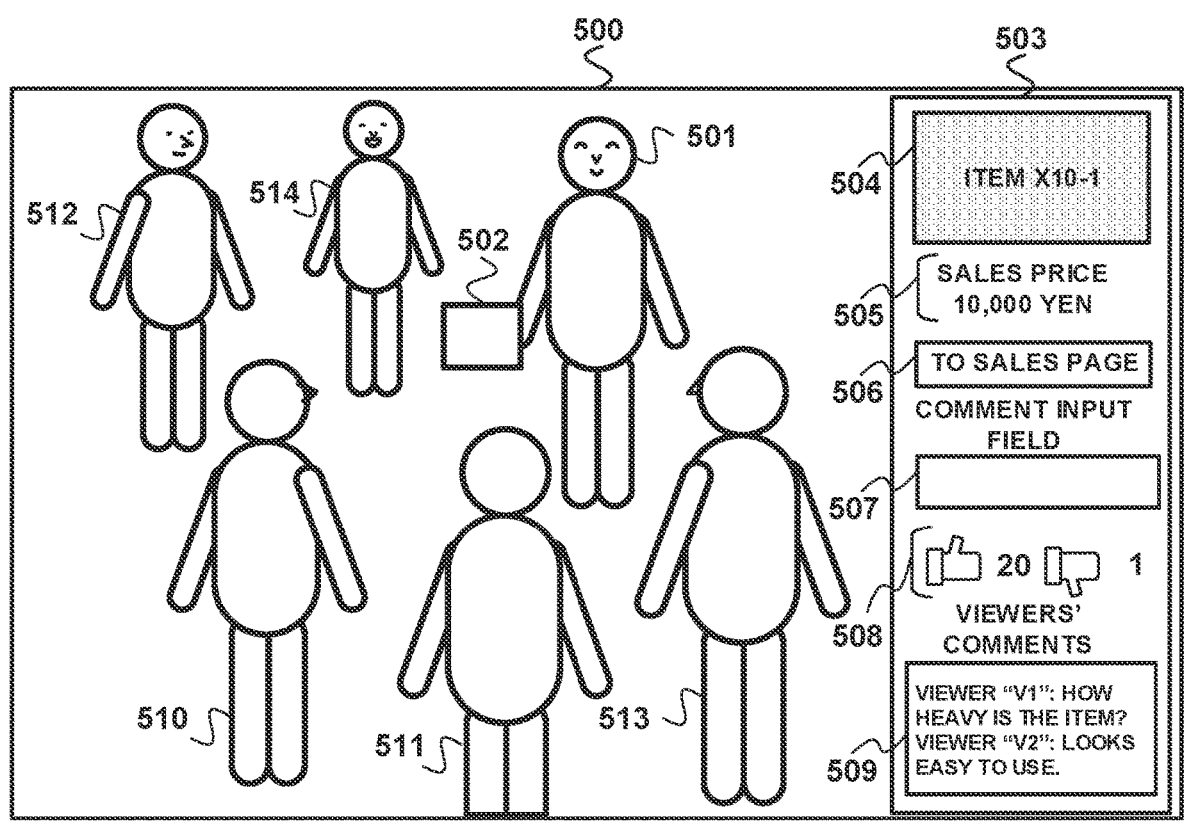
FIG. 8 is a diagram illustrating avatars displayed on the screen of the viewer terminal according to the embodiment.

FIG. 8 illustrates the state of the screen 500 of the viewer terminal 300 after a new referent is allocated. The screen 500 displays the avatar 513 of the viewer "V19" and the avatar 514 of the viewer "V20."

The generator 104 generates display control information that highlights the avatars of each viewer and of the referents allocated to the viewer based on the collected behavior related to purchasing while the viewers are viewing the live streaming video.

Figure 9:
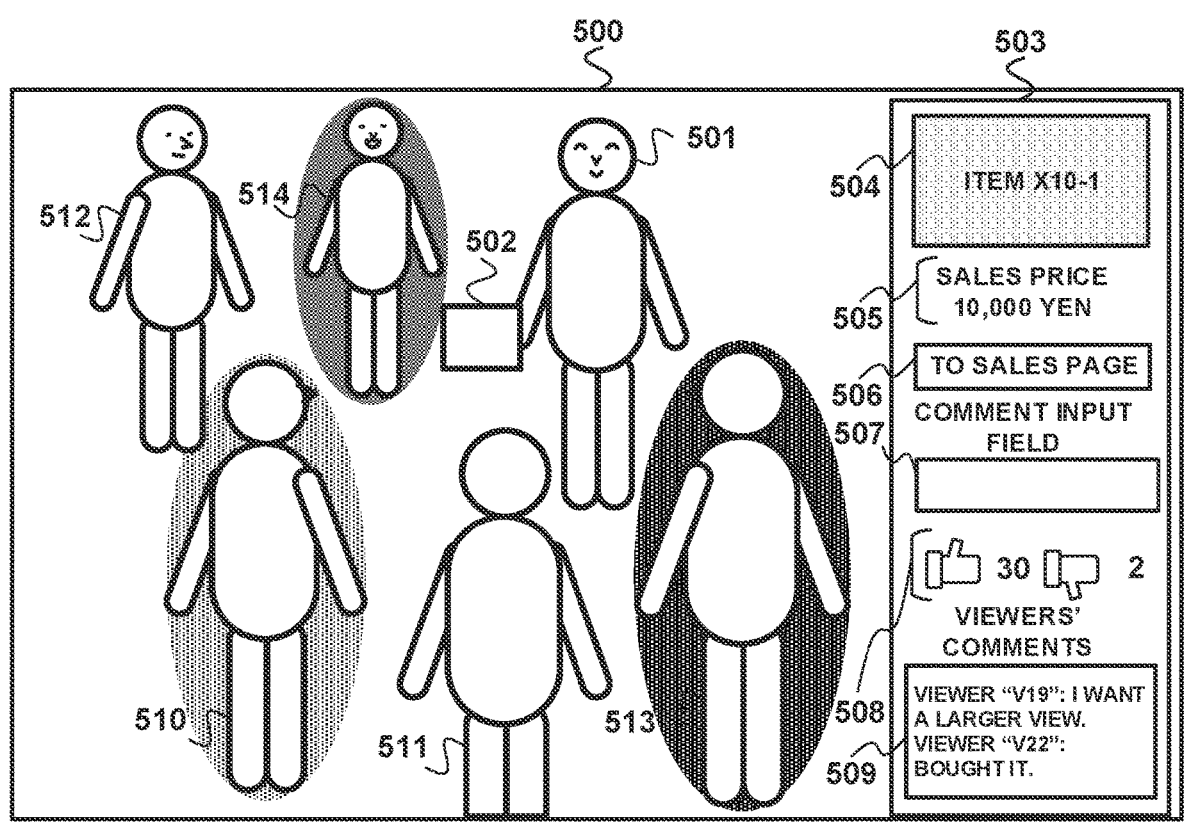
FIG. 9 is a diagram illustrating highlighted avatars displayed on the screen of the viewer terminal according to the embodiment.

For example, the generator 104 generates display control information that highlights, more conspicuously, the avatars of the viewer and referents whose behavior is at a closer stage to completing a purchase settlement of the item on the screen 500. For example, the generator 104 generates display control information that attaches more intensive colors around the avatars of the viewer and referent whose behavior is at the closer stage to completing the purchase settlement of the item. Alternatively, the generator 104 generates display control information that lights with higher intensity around the avatars of the viewer and referent whose behavior is at the closer stage to completing the purchase settlement of the item FIG. 9 illustrates a state in which the screen 500 displays avatars highlighted with color intensity. For example, it is assumed that: the viewer "V1" browses the sales page of the item "X10-1;" the viewer "V19" who is a referent of the viewer "V1" completes the purchase settlement of the item "X10-1;" and the viewer "V20" who is a referent of the viewer "V1" places the item "X10-1" into the electronic cart. In this case, the generator 104 generates display control information that attaches colors around avatars so that more intensive colors are attached around the avatar 510 of the viewer "V1," the avatar 514 of the viewer "V20," and the avatar 513 of the viewer "V19" in ascending order. The transmitter 105 transmits the generated display control information to the viewer terminal 300 of the viewer "V1," and the viewer terminal 300 of the viewer "V1" displays the screen of FIG. 9.

Alternatively, the generator 104 generates display control information that causes the avatars of each viewer and of the referent allocated to the viewer to have an object indicating the behavior related to purchasing while the viewers are viewing the live streaming video.

The behavior related to purchasing includes, for example, browsing the sales page of the item, placing the item into the electronic cart, and completing a purchase settlement of the item. Also, for example, an object indicating browsing the sales page of the item is a smartphone object, an object indicating placing the item into the electronic cart is a shopping basket object, and an object indicating completing the purchase settlement of the item is a shopping bag object.

Figure 10:
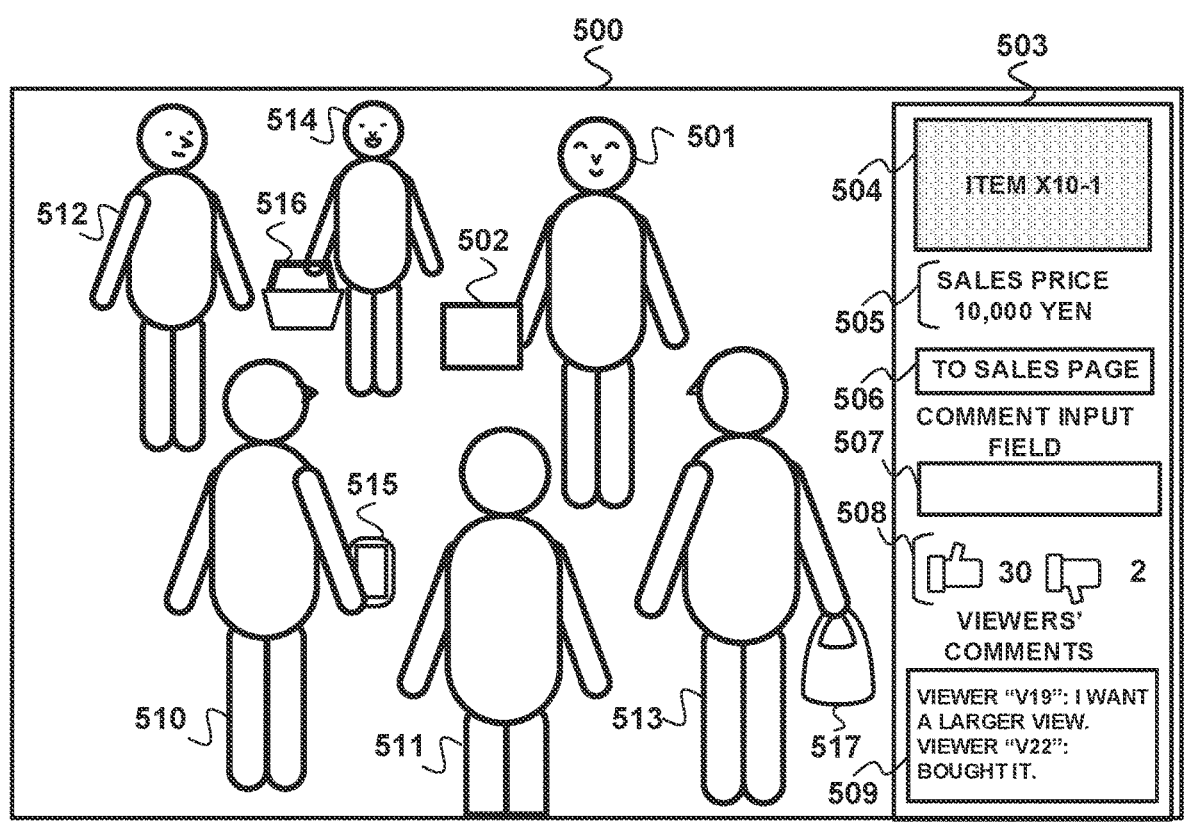
FIG. 10 is a diagram illustrating avatars having an object displayed on the screen of the viewer terminal according to the embodiment.

FIG. 10 illustrates a state in which avatars having objects indicating behaviors related to purchasing are displayed on the screen 500. The generator 104 generates display control information that causes the avatar 510 of the viewer "V1" to have a smartphone object 515, the avatar 513 of the viewer "V19" to have a shopping bag object 517, and the avatar 514 of the viewer "V20" to have a shopping basket object 516. The transmitter 105 transmits the generated display control information to the viewer terminal 300 of the viewer "V1," and the viewer terminal 300 of the viewer "V1" displays the screen of FIG. 10.

(4. Operation of the Distribution Server of the Embodiment)

The operation of the distribution server 100 according to the present embodiment is described with reference to FIGS. 11 to 13.

Figure 11:
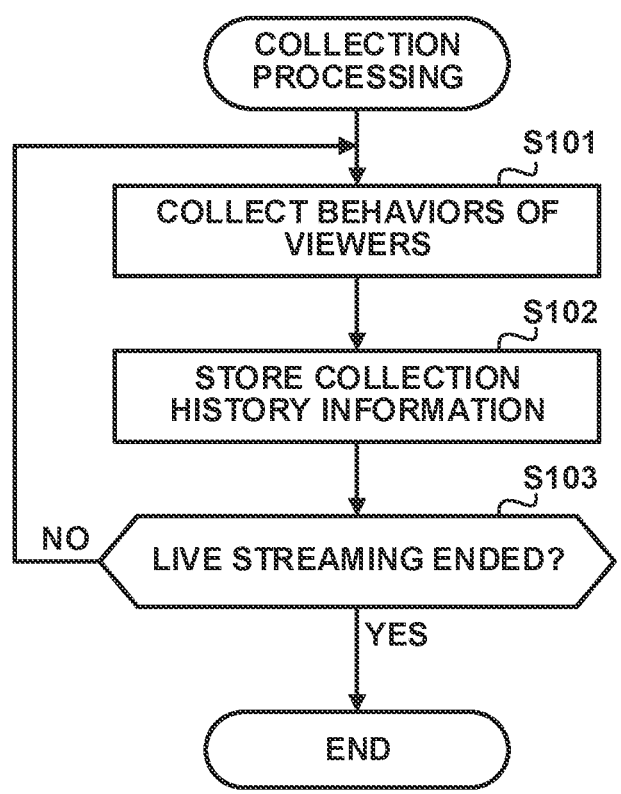
FIG. 11 is a flowchart illustrating collection processing according to the embodiment.

First, the processing of FIG. 11 is described. The collection processing of FIG. 11 starts when a video is live-streamed by the distribution server 100.

The collector 101 collects behaviors of a plurality of viewers viewing the live streaming video from a plurality of viewer terminals 300 that is respectively used by the plurality of viewers (step S101).

For example, when the video "X10" is live-streamed, the collector 101 collects the behaviors of the plurality of viewers from the viewer terminals 300 of the respective viewers who are viewing the video "X10."

The collector 101 stores the collected behaviors in the storage 102 as behavior history information (step S102).

For example, for each viewer, the collector 101 stores the viewer ID, the video ID, the item ID, the behavior status, and the date and time of the behavior in association with one another as behavior history information in the storage 102.

The collector 101 determines whether the live streaming of the video has ended (step S103). When the collector 101 determines that the live streaming of the video has ended (step S103: YES), the collector 101 ends the collection processing. On the other hand, when the collector 101 determines that the live streaming of the video has not ended (step S103: NO), the processing returns to step S101.

For example, the collector 101 ends the collection of behaviors from the viewer terminals 300 when the live streaming of the video "X10" ends. On the other hand, when the collector 101 determines that the live streaming of the video "X10" has not ended, the collector 101 continues to collect the behaviors of the viewers from the plurality of viewer terminals 300.

Figure 12:
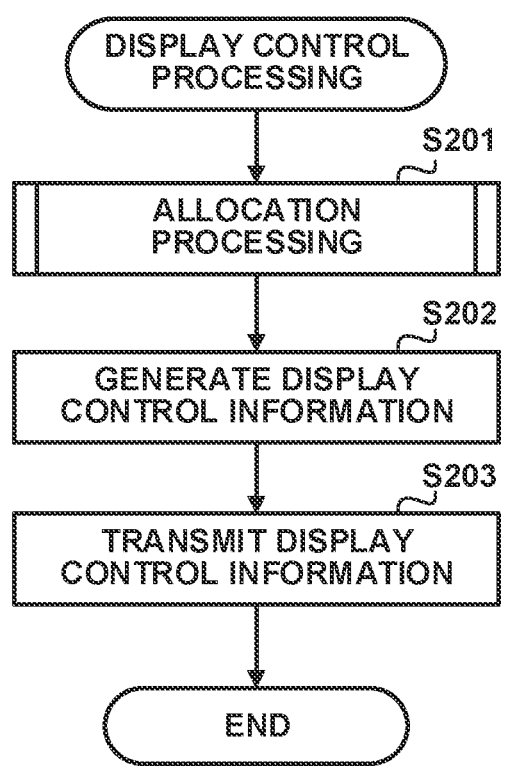
FIG. 12 is a flowchart illustrating display control processing according to the embodiment.

Next, the processing of FIG. 12 is described. The display control processing of FIG. 12 is processing that is executed periodically at a time specified by the administrator of the distribution server 100 before live streaming of a video starts, and during the live streaming of the video.

The allocator 103 executes allocation processing to allocate a referent to each of the plurality of viewers (step S201).

The allocation processing executed by the allocator 103 is described with reference to the flowchart of FIG. 13.

The allocator 103 determines whether the video is before being live-streamed (step S301). When the allocator 103 determines that the video is before being live-streamed (step S301: YES), the allocator 103 refers to the behavior history information stored in the storage 102 to specify, for each viewer who has a viewing reservation of the video, another viewer as a referent from among the plurality of viewers who has a viewing reservation of the video (step S302). Then, the allocator 103 allocates the specified referent to the viewer (step S303).

For example, the allocator 103 identifies the genre of a viewed video from the past behavior history information of the viewers "V1" to "VL" who have a viewing reservation of the video "X10" and specifies another viewer who has viewed a video of the same genre, as a referent, for each of the viewers "V1" to "VL." Then, the allocator 103 stores the viewer ID and the viewer ID of the specified referent as referent information.

At step S301, when the allocator 103 determines that the video is not before being live-streamed, that is, the live streaming has started (step S301: NO), the allocator 103 determines whether a behavior collected by the collector 101 satisfies the salient condition (step S304). When the allocator 103 determines that the behavior of the viewer collected by the collector 101 satisfies the salient condition (step S304: Yes), the allocator 103 specifies the viewer who satisfies the salient condition as a new referent for each viewer who is not allocated with the referent who satisfies the salient condition (step S305). On the other hand, when the allocator 103 determines that the behavior collected by the collector 101 does not satisfy the salient condition (step S304; NO), the allocator 103 ends the allocation processing.

For example, when the allocator 103 determines that the collected behavior for the viewer "V19" satisfies the salient condition after the live streaming of the video "X10" started, the allocator 103 refers to and searches the referent information of FIG. 6 for a viewer to whom the viewer "V19" is not allocated as a referent. Then, when the allocator 103 determines that the viewer "V19" is not allocated as a referent to the viewer "V1" as the result of the search, the allocator 103 specifies the viewer "V19" as the referent for the viewer "V1." When there is any other viewer than the viewer "V1" to whom the viewer "V19" is not allocated as a referent, the allocator 103 also specifies the viewer "V19" as the referent for the viewer. When there are a plurality of viewers whose behavior satisfies the salient condition, for each of the plurality of viewers whose behavior satisfies the salient condition (for example, the viewer "V19," the viewer "V20"), the allocator 103 searches for a viewer to whom each of the plurality of viewers whose behavior satisfies the salient condition is not allocated as the referent and specifies the plurality of viewers whose behavior satisfies the salient condition as referents for the searched viewer. On the other hand, when the allocator 103 determines that the behavior of a viewer collected after the start of the live streaming of the video "X10" does not satisfy the salient condition, the allocator 103 ends the allocation processing.

The allocator 103 starts processing of steps S307 to S309 for each viewer for whom a referent is specified (step S306). The allocator 103 determines whether the number of referents allocated to the viewer for whom a referent is specified has reached a threshold (step S307). When the allocator 103 determines that the number of allocated referents has reached the threshold (step S307: YES), the allocator 103 deletes a referent with the lowest degree of behavior among the referents (step S308). The allocator 103 then allocates the referent specified with regard to the viewer at step 305 as a new referent to the viewer (step S309). On the other hand, when the allocator 103 determines that the number of allocated referents has not reached the threshold (step S307: NO), the allocator 103 allocates the referent specified with regard to the viewer at step 305 as a new referent to the viewer (step S309). The processing of steps S307 to S309 is repeated for each viewer for whom a referent is specified. Note that when a plurality of referents is specified for a viewer, the processing of steps S307 to S309 is repeated for the viewer for the number of specified referents. Then, when the processing of steps S307 to S309 has completed (step S310) for each viewer for whom a referent is specified, the allocator 103 ends the allocation processing.

For example, when the allocator 103 determines that the viewer "V1" for whom the viewer "V19" and the viewer "V20" are specified as referents has already been allocated with the upper limit value N referents, the allocator 103 deletes one referent with the lowest degree of behavior among the N viewers who have already allocated as the referents and allocates the viewer "V19" as a new referent. The allocator 103 further deletes another referent with the lowest degree of behavior among the N referents including the viewer "V19" and allocates the viewer "V20" as a new referent. On the other hand, when the allocator 103 determines that the viewer "V2" for whom the viewer "V19" is specified as a referent is allocated with fewer referents than the upper limit value N, the allocator 103 allocates the viewer "V19" to the viewer "V2" as a new referent.

Figure 13:
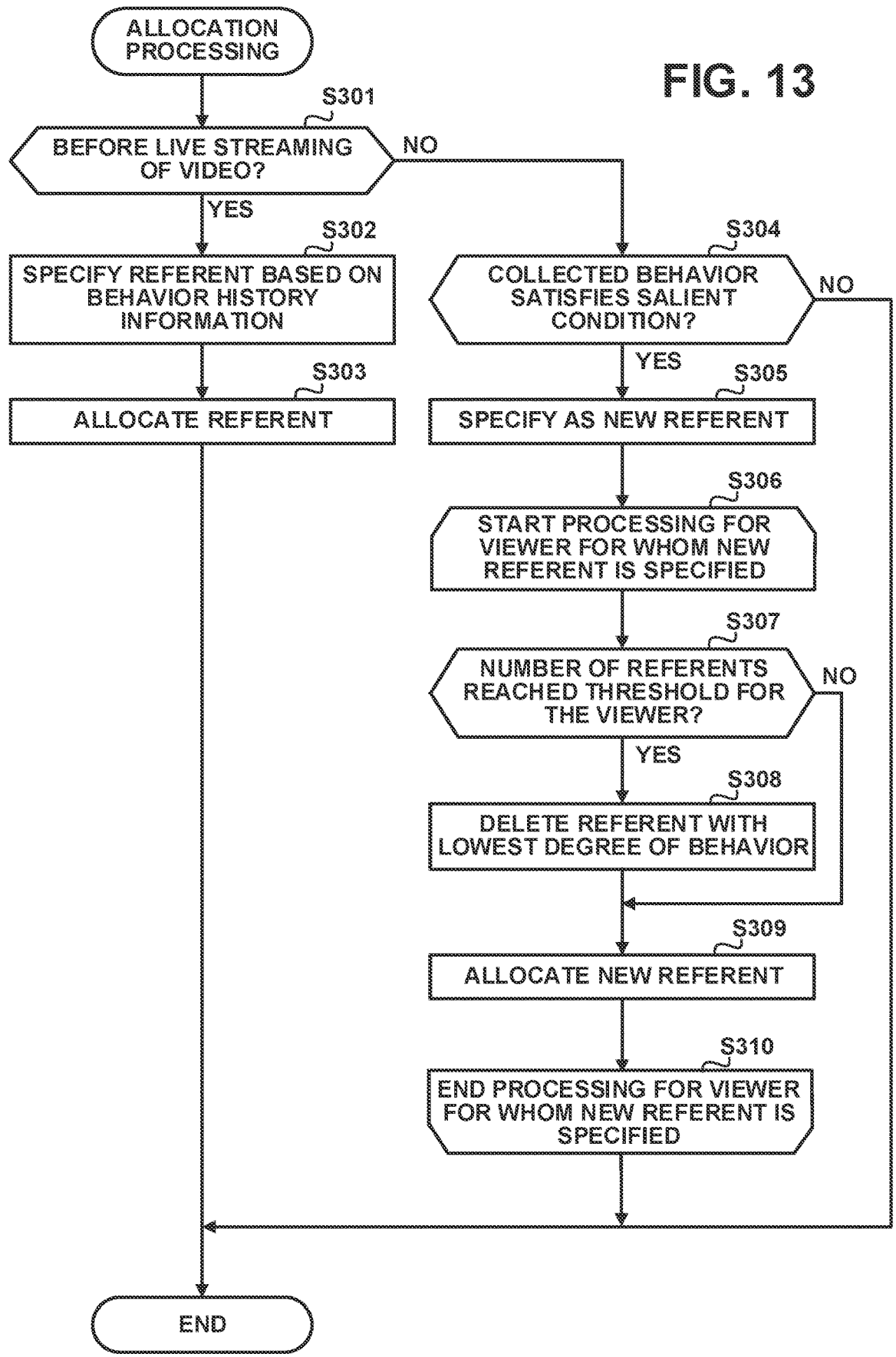
FIG. 13 is a flowchart illustrating allocation processing according to the embodiment.

Upon completion of the allocation processing of FIG. 13, returning to FIG. 12, the generator 104 generates display control information for each viewer based on the behavior of the viewer and the behavior of the referent allocated to the viewer among the collected behaviors (step S202). Then, the transmitter 105 transmits the generated display control information to the viewer terminal used by each viewer (step S203).

For example, during the live streaming of the video "X10," the generator 104 generates display control information that highlights, more conspicuously, the avatars of the viewer and the referent whose behavior is at a closer stage to completing a purchase settlement of the item on the screen 500. Then, the transmitter 105 transmits the generated display control information to the viewer terminal 300 of the viewer who is viewing the live streaming video "X10." For example, when display control information for attaching more intensive colors around the avatars in the order of the avatar 510 of the viewer "V1," the avatar 514 of the viewer "V20," and the avatar 513 of the viewer "V19" is transmitted to the viewer terminal 300 of the viewer "V1," the viewer terminal 300 of the viewer "V1" displays the screen of FIG. 9.

According to the present embodiment, during viewing of a live streaming video, behaviors of a plurality of viewers are collected, another viewer is allocated to a viewer as a referent, and, based on the behaviors of the viewer and the referent, display control information of information to be displayed on the viewer terminal of the viewer is generated and transmitted. In this way, since behavior information is collected from the viewer terminals of a plurality of viewers and display control information is provided to the plurality of viewer terminals in a star topology communication network, communication traffic can be suppressed. In addition, since display control information that reflects the behaviors of other viewers of the live streaming video is generated and provided to the viewer terminal, the viewer can view the live streaming video while referring to the behaviors of the other viewers.

Further, according to the present embodiment, the avatars of the viewer and referent whose mode changes based on the collected behaviors can be displayed on the viewer terminal. This makes it possible to see the behaviors of other viewers in a more understandable manner. In addition, the avatars displayed on the viewer terminal are not the avatars of all the plurality of viewers who is viewing the live streaming video but only the avatars of the viewer of the viewer terminal and the referents allocated to the viewer, which allows suppressing the load on the viewer terminal.

Further, according to the present embodiment, a person who has performed a conspicuous behavior compared to other viewers during the live streaming of the video is allocated as a referent. This allows presenting the behavior of another viewer who has taken a conspicuous behavior to the viewer. For example, a viewer who has purchased an item or the like while a video related to live commerce is live-streamed is specified as a referent, and the behavior of this referent is presented to the viewer via the viewer terminal. This allows increasing the viewer's purchase motivation.

Further, according to the present embodiment, since an upper limit is set on the number of referents allocated to a viewer, the load on the viewer terminal can be suppressed. For example, since an upper limit is set on the number of avatars displayed on the screen of the viewer terminal, the load on the viewer terminal can be suppressed. In addition, the load on the viewer terminal can be adjusted by adjusting the upper limit value.

Further, according to the present embodiment, when the number of referents allocated to a viewer has reached the upper limit, a referent with a low degree of behavior is deleted and a new referent is allocated. This allows switching from a referent with a low degree of activity to a referent with a salient behavior, increasing an opportunity for the viewer to refer to such a behavior. For example, the avatars alternate on the viewer terminal so that an inactive avatar leaves the screen and an avatar who takes a salient behavior appears on the screen, as the result, the salient behavior can increase the viewer's purchase motivation.

According to the present embodiment, avatars are highlighted based on the purchase behaviors of a viewer and a referent. This makes it possible to promote the purchase behaviors of the viewer and the other viewer as the referent who want to stand out more.

Further, according to the present embodiment, avatars having an object indicating the purchase behavior of a viewer and a referent are displayed. This visualizes other viewers' purchase behaviors in an easy-to-understand manner, giving the viewer the feeling as if the viewer is shopping at a real store. For example, in reality, you can feel the popularity of an item by seeing many people gathering around the item or putting the item in shopping baskets. Likewise, by letting avatars have an object that indicates the purchase behavior, the viewer can feel the degree of popularity of the item.

(5. Variations)

Although the embodiment of the present disclosure has been described above, variations and applications according to various embodiments are possible in carrying out the present disclosure.

In the above embodiment, the video distribution system 1 includes but is not limited to one distribution server 100. The function of the distribution server 100 may be realized by a plurality of servers.

Furthermore, although it is assumed that the avatar mode changes based on the display control information in the above-described embodiment without limitation, the mode of other information that is displayed on the screen may change depending on the display control information. For example, the display mode of the viewer name in the viewers comment display field 509 may change depending on the display control information.

Furthermore, although the same upper limit values N and M are set for a plurality of viewers in the above-described embodiment, the upper limit values are not limited thereto and different upper limit values may be set for each viewer. Alternatively, the upper limit values may be set by the viewer of the viewer terminal 300 themselves.

Furthermore, in the above-described embodiment, the display control processing of FIG. 12 is assumed to be periodically executed during the live streaming of the video, but the display control processing is not limited thereto. For example, the display control processing of FIG. 12 may be performed when the behavior collected by the collector 101 satisfies the salient condition.

Furthermore, by applying a program that regulates the operation of the distribution server 100 according to the above-described embodiment to an existing personal computer or information terminal device, the personal computer or information terminal device can be made to function as the distribution server 100 according to the embodiment.

Additionally, the aforementioned program may be recorded in a non-transitory recording medium. The non-transitory recording medium may be distributed and sold independently of a computer. Here, the non-transitory recording medium means a tangible recording medium. The non-transitory recording medium includes, for example, a compact disk, a flexible disk, a hard disk, a magneto-optical disk, a digital video disc, a magnetic tape, a semiconductor memory, and the like. Whereas, a transitory recording medium indicates a transmission medium (a propagation signal) itself. The transitory recording medium includes, for example, an electrical signal, an optical signal, an electromagnetic wave, and the like. Note that a temporary storage region is a region for temporarily storing data, a program, and/or the like, and is a volatile memory such as RAM, for example.

(Supplementary Notes)

[1]

A video distribution system including one or more processors, wherein at least one of the one or more processors performs processing of:

collecting behaviors of a plurality of viewers viewing a live streaming video from a plurality of viewer terminals respectively used by the plurality of viewers;

allocating, to each viewer of the plurality of viewers, another viewer specified as a referent from among the plurality of viewers based on the collected behaviors;

generating display control information for the each viewer based on a behavior of the each viewer and a behavior of the referent allocated to the each viewer among the collected behaviors; and transmitting the generated display control information to a viewer terminal used by the each viewer.

[2]

The video distribution system according to [1], wherein at least one of the one or more processors performs processing of causing the viewer terminal used by the each viewer to display avatars of the each viewer and of the referent allocated to the each viewer by changing modes of the avatars based on the transmitted display control information.

[3]

The video distribution system according to [1] or [2], wherein at least one of the one or more processors performs processing of, when the collected behavior satisfies a salient condition, allocating a viewer whose behavior satisfies the salient condition, as a new referent, to each viewer who is not allocated with the viewer whose behavior satisfies the salient condition as the referent.

[4]

The video distribution system according to [3], wherein at least one of the one or more processors performs processing of, when a number of referents allocated to the each viewer has reached a threshold, deleting one referent from the referents allocated to the each viewer and then allocating a viewer whose behavior satisfies the salient condition as a new referent to the each viewer.

[5]

The video distribution system according to [4], wherein at least one of the one or more processors performs processing of, when the number of referents allocated to the each viewer has reached the threshold, deleting one referent with a lowest degree of the collected behavior among the referents allocated to the each viewer.

[6]

The video distribution system according to any one of [2] to [5], wherein the video introduces an item, the collected behaviors include a behavior related to purchasing the item introduced in the video, and at least one of the one or more processors performs processing of generating display control information that highlights avatars of the each viewer and of the referent allocated to the each viewer based on the collected behavior related to purchasing while the viewers are viewing the live streaming video.

[7]

The video distribution system according to any one of [2] to [6], wherein the video introduces an item, the collected behaviors include a behavior related to purchasing the item introduced in the video, and at least one of the one or more processors performs processing of generating display control information that causes avatars of the each viewer and of the referent allocated to the each viewer to have an object indicating the behavior related to purchasing while the viewers are viewing the live streaming video.

[8]

A display control method including: by a computer, collecting behaviors of a plurality of viewers viewing a live streaming video from a plurality of viewer terminals respectively used by the plurality of viewers;

allocating, to each viewer of the plurality of viewers, another viewer specified as a referent from among the plurality of viewers based on the collected behaviors;

generating display control information for the each viewer based on a behavior of the each viewer and a behavior of the referent allocated to the each viewer among the collected behaviors; and transmitting the generated display control information to a viewer terminal used by the each viewer.

[9]

A non-transitory computer-readable recording medium on which is recorded a program for causing a computer to perform:

collecting behaviors of a plurality of viewers viewing a live streaming video from a plurality of viewer terminals respectively used by the plurality of viewers;

allocating, to each viewer of the plurality of viewers, another viewer specified as a referent from among the plurality of viewers based on the collected behaviors;

generating display control information for the each viewer based on a behavior of the each viewer and a behavior of the referent allocated to the each viewer among the collected behaviors; and transmitting the generated display control information to a viewer terminal used by the each viewer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

According to the present disclosure, a video distribution system, a display control method, and a non-transitory recording medium that are capable of reducing the load of display processing can be provided.

REFERENCE SIGNS LIST

1 Video distribution system
11 CPU
12 ROM
13 RAM
14 Recording medium
15 Output device
16 Communication device
17 Input device
18 Bus
100 Distribution server
101 Collector
102 Storage
103 Allocator
104 Generator
105 Transmitter
200) Distributor terminal
300 Viewer terminal
400 Computer communication network
500) Screen
501 Distributor
502 Item "X10-1"
503 Panel
504 Image
505 Information
506 Button
507 Input field
508 Rating icon
509 Display field
510 to 514 Avatar
515 to 517 Object

The invention claimed is:

1. A video distribution system comprising one or more processors, wherein at least one of the one or more processors performs processing of:
collecting behaviors of a plurality of viewers viewing a live streaming video from a plurality of viewer terminals respectively used by the plurality of viewers;
allocating, to a display of each viewer of the plurality of viewers, another viewer specified as a referent from among the plurality of viewers, wherein the allocating is based on the collected behaviors;
when the collected behavior satisfies a salient condition, allocating a viewer whose behavior satisfies the salient condition, as a new referent, to a display of each viewer who is not allocated with the viewer whose behavior satisfies the salient condition as the referent;
generating display control information for the each viewer based on a behavior of the each viewer and a behavior of the referent allocated to the display of each viewer among the collected behaviors; and
transmitting the generated display control information to a viewer terminal used by the each viewer.

2. The video distribution system according to claim 1, wherein at least one of the one or more processors performs processing of causing the viewer terminal used by the each viewer to display avatars of the each viewer and of the referent allocated to the display of the each viewer by changing modes of the avatars based on the transmitted display control information.

3. The video distribution system according to claim 1, wherein at least one of the one or more processors performs processing of, when a number of referents allocated to the display of the each viewer has reached a threshold, deleting one referent from the referents allocated to the display of the each viewer and then allocating a viewer whose behavior satisfies the salient condition as a new referent to the display of the each viewer.

4. The video distribution system according to claim 2, wherein
the video introduces an item,
the collected behaviors include a behavior related to purchasing the item introduced in the video, and
at least one of the one or more processors performs processing of generating display control information that highlights avatars of the each viewer and of the referent allocated to the display of the each viewer based on the collected behavior related to purchasing while the viewers are viewing the live streaming video.

5. The video distribution system according to claim 2, wherein
the video introduces an item,
the collected behaviors include a behavior related to purchasing the item introduced in the video, and
at least one of the one or more processors performs processing of generating display control information that causes avatars of the each viewer and of the referent allocated to the display of the each viewer to have an object indicating the behavior related to purchasing while the viewers are viewing the live streaming video.

6. The video distribution system according to claim 3, wherein at least one of the one or more processors performs processing of, when the number of referents allocated to the display of the each viewer has reached the threshold, deleting one referent with a lowest degree of the collected behavior among the referents allocated to the display of the each viewer.

7. A display control method comprising: by a computer,
collecting behaviors of a plurality of viewers viewing a live streaming video from a plurality of viewer terminals respectively used by the plurality of viewers;
allocating, to a display of each viewer of the plurality of viewers, another viewer specified as a referent from among the plurality of viewers, wherein the allocating is based on the collected behaviors;
when the collected behavior satisfies a salient condition, allocating a viewer whose behavior satisfies the salient condition, as a new referent, to a display of each viewer who is not allocated with the viewer whose behavior satisfies the salient condition as the referent;
generating display control information for the each viewer based on a behavior of the each viewer and a behavior of the referent allocated to the display of the each viewer among the collected behaviors; and
transmitting the generated display control information to a viewer terminal used by the each viewer.

8. A non-transitory computer-readable recording medium on which is recorded a program for causing a computer to perform:
collecting behaviors of a plurality of viewers viewing a live streaming video from a plurality of viewer terminals respectively used by the plurality of viewers;
allocating, to a display of each viewer of the plurality of viewers, another viewer specified as a referent from among the plurality of viewers, wherein the allocating is based on the collected behaviors;
when the collected behavior satisfies a salient condition, allocating a viewer whose behavior satisfies the salient condition, as a new referent, to a display of each viewer who is not allocated with the viewer whose behavior satisfies the salient condition as the referent;

generating display control information for the each viewer based on a behavior of the each viewer and a behavior of the referent allocated to the display of the each viewer among the collected behaviors; and transmitting the generated display control information to a viewer terminal used by the each viewer.

\* \* \* \* \*